United States Patent [19]
Henrick et al.

[11] 3,860,629

[45] Jan. 14, 1975

[54] CYCLOPROPANEMETHYL ESTERS

[75] Inventors: Clive A. Henrick; Gerardus B. Staal, both of Palo Alto, Calif.

[73] Assignee: Zoecon Corporation, Palo Alto, Calif.

[22] Filed: Apr. 13, 1973

[21] Appl. No.: 351,028

Related U.S. Application Data

[63] Continuation-in-part of Ser. No. 289,897, Sept. 18, 1972, Pat. No. 3,816,501.

[52] U.S. Cl. .............. 260/470, 260/463, 260/468 G, 260/468 H, 260/471 R, 260/473 R, 260/473 F, 260/475 R, 260/475 SC, 260/475 FR, 260/611 A, 260/613 R, 260/613 D, 424/301, 424/305, 424/308, 424/309, 424/339, 424/341

[51] Int. Cl. ...................... C07c 69/76, C07c 69/82

[58] Field of Search ............ 260/475 R, 471 R, 470, 260/473 R, 475 SC, 475 FR

[56] References Cited

FOREIGN PATENTS OR APPLICATIONS 1,911,520  9/1969  Germany ......................... 260/455 R

*Primary Examiner*—Lorraine A. Weinberger
*Assistant Examiner*—E. Jane Skelly
*Attorney, Agent, or Firm*—Lee-Louise H. Priest; Donald W. Erickson

[57] ABSTRACT

Organic compositions characterized by two cyclopropyl moieties, synthesis thereof, and compositions thereof for the control of mites.

9 Claims, No Drawings

CYCLOPROPANEMETHYL ESTERS

This application is a continuation-in-part of Ser. No. 289,897, filed Sept. 18, 1972, now U.S. Pat. No. 3,816,501.

This invention relates to novel compounds, synthesis thereof, compositions thereof and the control of mites.

The compounds of the present invention are effective for the control of spider mites. Spider mites are plant feeders and cause serious damage to orchard trees, field crops, greenhouse plants and other vegetation. They feed on the foliage or fruit of plants and trees and attack a variety of plants and trees due to their wide distribution. Spider mites of the family Tetranychidae, such as *Tetranychus urticae, Tetranychus canadensis, Tetranychus cinnabarinus, Tetranychus pacificus, Byrobia praetiosa, Oligonychus pratensis, Oligonychus ilicis, Panonychus citri, Panonychus ulmi*, and similar related species, are of particular biological interest and economic importance.

Compounds of the present invention of the following formula A are effective control agents for spider mites.

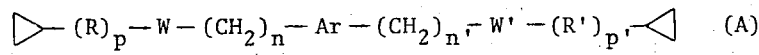

wherein,
W and W' are independently

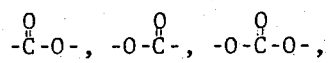

or —O—;
R and R' are independently alkylene or substituted alkylene;
Ar is arylene, and
each of $n$, $n'$, $p$ and $p'$ is zero or the positive integer 1.

The compounds of Formula A are applied to all mite stages, namely, during the egg, larvae, nymphal or adult stages to cause inability to pass from one stage to the next, or inability to reproduce. A compound of formula A, or mixtures thereof, can be applied at dosage levels of the order of 0.001 to 1%. Suitable carrier substances include liquid or solid inert carriers, such as water, acetone, xylene, mineral or vegetable oils, talc, vermiculite, and silica. Treatment of mites in accordance with the present invention can be accomplished by spraying, dusting, or otherwise contacting the mites and/or their eggs or larvae directly or indirectly. Generally, a concentration of less that 25% active compound is employed, although a higher concentration of the active compound can be used depending on the type of application and effectiveness of the active ingredient.

In formula (A) above, by arylene is meant any aromatic hydrocarbon ring of six to twenty carbon atoms, e.g., phenylene or napthylene, two phenyl or naphthyl rings joined by a direct bond or by an atom of oxygen, sulfur, or nitrogen, indenylene, fluorenylene, dihydronaphthylene, tetrahydronaphthylene, anthracylene, phenanthrylene, and the like. The arylene group can be substituted by one or two groups selected from alkyl, halogen, or nitro.

By alkylene is meant any saturated straight or branched chain hydrocarbon moiety of one to four carbon atoms, i.e., methylene, ethylene, n-propylene, i-propylene, n-butylene, s-butylene, or t-butylene. The alkylene group can be substituted by one or two groups selected from methyl, ethyl, halogen, or nitro.

By halogen is meant any halogen of atomic number 9-35, i.e., fluorine, chlorine, or bromine.

Included within the compounds of formula A are the following:

Carboxylic esters of formula I

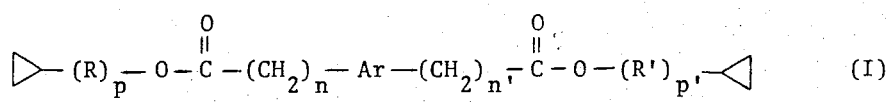

Carboxylic esters of formula II (W is $-\overset{O}{C}-O-$, W' is $-O-\overset{O}{C}-$)

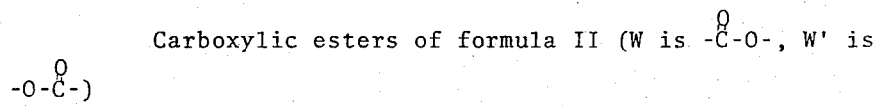

Carboxylic esters of formula III (W is $-\overset{O}{C}-O-$, W' is $-\overset{O}{C}-O-$)

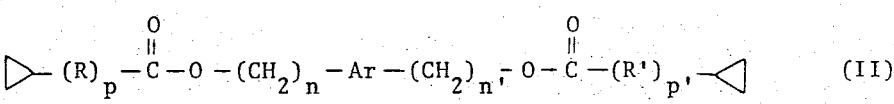

Carbonates of formula IV (W and W' are $-O-\overset{O}{C}-O-$)

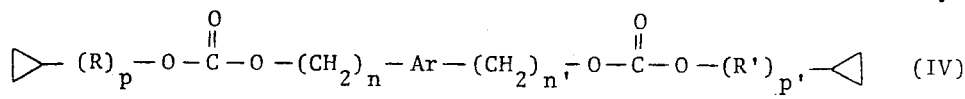

Ethers of formula V (W and W' are -O-)

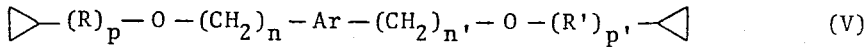

Typical compounds of formula 1 are the following:
bis (cyclopropyltrimethylene) benzene-1,3-dicarboxylate
bis (cyclopropylmethyl)-1,4-dinaphthoic acid diester
bis (cyclopropylmethyl)-2-chloro-5-methylbenzene-1,4-dicarboxylate
bis-(cyclopropylmethyl)-4,4'-thiodibenzoate
bis-(cyclopropylmethyl)-4,4'-iminodibenzoate
bis (cyclopropylmethyl) 1,4-benzenediacetic acid diester
bis (cyclopropyltetramethylene)-1,5-dinaphthoic acid diester
bis (cyclopropylmethyl)-1,5-dinaphthoic acid diester
bis (cyclopropylmethyl)-fluorene-1,4-dicarboxylic acid diester
bis (cyclopropylethylene)-1,4-dihydronaphthalene-5,8-dicarboxylic acid ester
bis (cyclopropylmethyl)-1,2,3,4-tetrahydronaphthalene-1,4-dicarboxylic acid ester Preferred compounds of formula I having a high degree of activity for the control of mites are those wherein the cyclopropane containing substitutents on the aromatic ring are in a para-relationship, n is zero, n' is zero, R and R' are methylene, p and p' are 1 and Ar is phenylene, 2,5-dimethylphenylene, biphenylene, 2,5-dichlorophenylene or o-nitrophenylene.

Typical compounds of formula II are the following:
p-biphenylene-bis-(3-cyclopropylpropionate)
m-phenylene-bis-(cyclopropanecarboxylate)
4,4°-oxidibenzyl-bis-(4-cyclopeopylbutyrate)
4,4'-thiodiphenyl bis (cyclopropanecarboxylate)
4,4'-aminodiphenyl (cyclopropaneacetate) 1,4-naphthylene-bis-(cyclopropanecarboxylate)
2-bromo-1,4-bis (cyclopropylcarbonyloxy) benzene
2,7-naphthylene-bis-(cyclopropanecarboxylate)
1,4-dimethylenebenzene-bis-(cyclopropanecarboxylate)
1,4-flourene-bis-(cyclopropaneacetate)
5,8-(1,4-dihydronaphthalene)-bis-(cyclopropanepropionate)

Preferred compounds of formula II having a high degree of activity for the control of mites are those wherein the cyclopropane containing substitutents on the aromatic ring are in a para-relationship, n is the positive integer 1, n' is the positive integer 1 and R and R' are single bonds.

Typical compounds of formula III are the following:
cyclopropyltrimethylene-4-(cyclopropylcarbonyloxy) benzoate
cyclopropylmethyl-4-(4'-cyclopropylacyloxyphenyl)-benzoate
cyclopropylmethyl-5-cyclopropylcarbonyloxynaphthoate Typical compounds of formula IV are the following:
1,4-bis (cyclopropylcarbonyldioxy) benzene
1,3-bis (cyclopropyltrimethylenecarbonyldioxy) benzene
4,4'-bis (cyclopropylmethylcarbonyldioxy) biphenyl
1,4-bis (cyclopropylcarbonyldioxy) naphthalene
4,4'-bis (cyclopropyltetramethylenecarbonyldioxy) diphenylamine
4,4'-bis (cyclopropylethylenecarbonyldioxy) diphenylsulfide
1,4-bis (cyclopropanecarbonyldioxy) 2-methyl-5-nitrobenzene Typical ethers of Formula V are the following:
1,4-bis (cyclopropylmethoxy) benzene
1,4-bis (cyclopropylethoxy) benzene
1,4-bis (cyclopropylmethoxymethyl) benzene
4,4'-bis (cyclopropylmethoxy) biphenyl
4,4'-bis (cyclopropylmethoxymethyl) diphenylsulfide
4,4'-bis (cyclopropyltrimethyloxy) iminodibenzene
1,4-bis (cyclopropylmethoxy) naphthalene
2,7-bis (cyclopropylethoxymethyl) naphthalene
1,4-bis (cyclopropylmethoxyethyl) indane
1,4-bis (cyclopropylmethoxy) fluorene
1,4-bis (cyclopropylmethoxy) anthracene
5,8-bis (cyclopropylethoxy)-1,4-dihydronaphthalene The carboxylic esters of formula I are prepared by the reaction of an aromatic di-acid halide, such as terephthalic acid chloride, with an alcohol of the formula

[Note: R-OH with cyclopropyl group]

neat or in an organic solvent inert to the reaction, such as a hydrocarbon or ether solvent. Usually an excess of said alcohol is employed and the reaction proceeds at room temperature satisfactorily, although higher or lower temperatures may be used. The reaction is usually conducted in the presence of pyridine.

The carboxylic esters of formula II are prepared by the reaction of a cyclopropane acid halide, such as cyclopropanemethylcarboxylic acid chloride, with a dihydroxy-substituted aromatic compound, such as 4,4'-di-hydroxybiphenyl, neat or in an organic solvent inert to the reaction, such as hydrocarbon or ether solvent. Usually, an excess of said acid halide is employed and the reaction proceeds satisfactorily at room temperature, although higher or lower temperatures may be used. The reaction is usually conducted in the presence of pyridine.

The compounds of formula III are prepared by a two-step process. Step 1 is the reaction of a hydroxy-substituted aromatic acid, such as p-hydroxybenzoic acid with a carboxylic acid halide either neat or in an organic solvent inert to the reation, such as a hydrocarbon or ether solvent, followed by reaction of the intermediate thus formed with water. At least a two-fold excess of the acid halide is employed and the reaction proceeds satisfactorily at room temperature, usually in the presence of pyridine. Step 2 is the reaction of the product of Step 1 with a halogenating agent, such as thionyl chloride-dimethylformamide complex, phosgene, phosphorus pentabromide, and the like, followed by addition of a cyclopropane alcohol. Step 2 can be conducted neat or in an organic solvent as to Step 1. The addition of the cyclopropane alcohol is carried out at less than room temperature. The halogenation step proceeds satisfactorily at room temperature; however, higher or lower temperatures can be employed. The reaction is usually carried out in the presence of pyridine.

The compounds of formula IV are prepared by the reaction of a bis (haloformyl) aromatic compound and a cyclopropane alcohol neat or in an organic solvent inert to the reaction, such as a hydrocarbon or ether solvent. Usually an excess of the alcohol is employed and the reaction proceeds satisfactorily at room temperature. The reaction is usually carried out in the presence of pyridine.

The compounds of Formula I can be prepared by a) reacting a dihydric alcohol of the formula HO—(CH$_2$)$_n$—Ar—(CH$_2$)$_n$—OH with two equivalents of sodium or sodium hydride, followed by b) reacting the resultant mixture with two equivalents of a halide of the formula

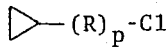

and an iodide-ion generator, such as potassium iodide. Step a) is ordinarily carried out in a solvent inert to the reaction, such as tetrahydrofuran, and the reaction mixture is boiled for a period of from 1 to 10 hours to insure complete formation of the sodium salt. Step b) is ordinarily carried in the presence of a solvent inert to the reaction, such as hexamethylphosphorictrimide. The reaction ordinarily proceeds when allowed to sit 3 to 5 days at room temperature and then boiled for 24 to 48 hours.

In an alternative method of preparation, a dihydric alcohol of the formula HO—(CH$_2$)$_n$—Ar—(CH$_2$)$_n$—OH is dissolved in a solvent inert to the reaction, such as tetrahydrofuran, at 0°C, two equivalents of n-butyl lithium is added, the reaction mixture allowed to warm to room temperature, and then stirred for two hours. This reaction mixture can then be used in step b) above to yield the appropriate bis-ether.

The mite control agents of the present invention can be used alone in an inert carrier substance for the control of mites (Arachnids) or can be used in mixture with pesticides and/or juvenile hormone analogs known in the art in order to obtain a broader spectrum of activity. Suitable insecticides include Baygon, Captan, Sevin, Ciodrin, Systox, Diazinon, Vapona, Cygon, Dimethrin, Dursban, Malathion, and Parathion. Typical juvenile hormone analogs which can be used in mixture with the compounds of formula A of the present invention are described in Belgian Pat. Nos. 778,214; 778,241 and 778,242.

The following examples are provided to illustrate the syntheses of the compounds of the present invention and the practice of the present invention. Temperature in degrees Centigrade.

EXAMPLE 1

To a mixture of 43.3 g. of cyclopropylmethanol and 200 ml. of dry ether, under nitrogen, is slowly added a mixture of 57.8 g. of terephthaloyl chloride and 150 ml. of dry ether. The reaction mixtue is stirred overnight at room temperature under nitrogen, then the reaction mixture is heated to reflux for about one hour. Heat is removed and then 36 ml. of pyridine is added slowly with stirring. After about 2.5 hours, the reaction is worked up by adding about 500 ml. of water and shaking and then the ether solution is washed with saturated sodium bicarbonate solution, water and brine, dried over magnesium sulfate and filtered. The filtrate is concentrated, recrystallized from methanol, filtered, washed with cold methanol and dried to yield crystalline bis-(cyclopropylmethyl) ester of terephthalic acid having a melting point of 60°–60.5°.

EXAMPLE 2

To a mixture of 2 g. of terephthaloyl chloride and 30 ml. of dry ether, under nitrogen, is added 4.27 g. of cvyclopropylmethyl alcohol. The reaction mixture is allowed to stand at room temperature, with stirring, for 3 days. The reaction mixture is poured into water and extracted with benzene. The organic phase is washed with saturated sodium bicarbonate solution, water and brine, dried over calcium sulfate and solvent removed to give crystalline bis-(cyclopropylmethyl) ester of terephthalic acid, which can be further purified by recrystallization using ether-hexane.

EXAMPLE 3

To a mixture of 2 g. of isophthaloyl chloride and 20 ml. of dry ether, under nitrogen, is added 4.27 grams of cyclopropylmethyl alcohol. The reaction mixture is allowed to stand at room temperature, with stirring, for 3 days. The reaction mixture is poured into water and extracted with ether. The organic phase is washed with saturated sodium chloride solution, water and brine, dried over calcium sulfate and solvent removed to yield cyclopropanemethyl ester of isophthalic acid, having a boiling point of 129°–131° bath at 0.04 mm.

EXAMPLE 4

Using the procedure of Example 2, the cyclopropylmethyl ester of phthalic acid having a boiling point of 101° bath at 0.12 mm is prepared from 2 g. of phthaloyl chloride and 4.27 g. of cyclopropylmethyl alcohol.

EXAMPLE 5 a. A solution of 3.00 g. dimethyl formamide dimethylacetal and 7.26 g. of cyclopropylmethyl alcohol in 2 ml. of benzene is refluxed through 3 A molecular sieves for 14 hours.

One third of this solution in 20 ml. of benzene is refluxed for 2 hours under nitrogen. This reaction mixture is extracted with an ether and water mixture, the organic layer removed, and the aqueous layer extracted once with ether. The combined ether layers are washed with brine, dried over calcium sulfate and the solvent removed to yield dimethylformamide di(cyclopropanemethyl)acetal.

b. To a solution of 2,5-dichloroterephthalic acid in 20 ml. of benzene is added the reaction product of step a) above. The reaction mixture is refluxed for 1 hour and then extracted with a solution of 3N sulfuric acid and ether. The organic layer is removed and the aqueous portion extracted with ether. The combined ether phases are washed with a 10% potassium carbonate solution, water and brine, dried over calcium sulfate, and the solvent evaporated to yield the cyclopropylmethyl diester of 2,5-dichloroterephthalic acid having a melting point of 69°.

EXAMPLE 6

Using the procedure of Example 5, the cyclopropylmethyl diester of 2,5-dimethylterephthalic acid having a melting point of 85°–86° is prepared from 2,5-dimethylterephthalic acid and dimethylformamide di(cyclopropanemethyl)acetal.

EXAMPLE 7 a. A solution of 6.00 g. (28.5 millimoles) of nitroterephathalic acid, 6.15 ml. (85.4 millimoles) of thionyl chloride, and 1.32 ml. (17.1 millimoles) of dimethylformamide in 100 ml. of ether is stirred at room temperature for 4 hours. Two liquid phases form and the upper liquid phase is decanted off and the solvent removed to give a liquid product.

b. To a solution of the product of a) above in 100 ml. of ether is added 6.15 g. (85.4 millimoles) of cyclopropylmethyl alcohol and 6.9 ml. (85.4 millimoles) of pryidine at 0°C. The reaction mixture is stirred for 3 days and then organic with a mixture of ether and water. The orgainic layer is removed and the aqueous layer extracted with ether. The combined ether layers are washed with 3N sulfuric acid, 10% potassium carbonate, water and brine, dried over calcium sulfate, and the solvent removed to yield the cyclopropylmethyl diester of nitroterephthalic acid.

EXAMPLE 8 a. To a mixture of 1.78 ml. (24.8 millimoles) of thionyl chloride and 2.0 g. (8.27 millimoles) of 4,4'-biphenyldicarboxylic acid is added, under nitrogen, 0.66 ml. (6.2 millimoles) of dimethylformamide. The reaction mixture is stirred for 2 hours at room temperature, refluxed overnight, diluted wtih ether, and then the ether and excess thionyl chloride removed by evaporation.

To a mixture of the product of a) above in 50 ml. dry ether is added 1.79 g. (24.8 millimoles) of cyclopropylmethyl alcohol and 3.0 ml. (24.8 millimoles) of pyridine. The reaction mixture is stirred for 3 days at room temperature, extracted with an ether/water solution, the ether layer removed, and the aqueous phase extracted with ether. The combined ether phases are washed with 3N sulfuric acid, 10% potassium carbonate, water, saturated aqueous cupric sulfate, water, and brine, dried over calcium sulfate, the solvent removed, and teh residue recrystallized from hexane to yield the cyclopropylmethyl diester of 4,4-biphenyldicarboxylic acid, having a melting point of 85°–86°.

EXAMPLE 9

Using the procedure of Example 7, the cyclopropylmethyl diester of 4,4-oxydibenzoic acid having a melting point of 85°–86° is prepared from 6.0 g. of 4,4'-oxydibenzoic acid, 5.0 ml. of thionyl chloride, 1.7 ml. of dimethylformamide, 5.0 g. of cyclopropylmethyl alcohol, and 5.6 ml. of pyridine.

EXAMPLE 10

To a solution of 3.0 g. of 1,4-benzenedimethanol in 50 ml. of dry ether is added dropwise, under nitrogen, 11.35 g. of cyclopropane carboxylic acid chloride. The reaction mixture is stirred for 3 days under nitrogen, poured into water and extracted with ether. The organic layer is washed with sodium bicarbonate, water and brine, dried over calcium sulfate, and the solvent evaporated to yield 1,4-dimethylenephenyl bis-(cyclopropanecarboxylate), having a melting point of 55°–57°.

EXAMPLE 11

A mixture of 5.5 g. of 1,4-dihydroxybenzene, 15 g. of cyclopropane carboxylic acid chloride and 2.4 g. of magnesium in 55 ml. of dry benzene is refluxed for 8 hours. The solution is then diluted with ether, washed with aqueous sodium bicarbonate, dilute aqueous hydrochloric acid, water and brine, dried over calcium sulfate, and recrystallized from ethanol/water to yield p-phenylene-bis-(cyclopropanecarboxylate), having a melting point of 137°.

EXAMPLE 12 a. To a mixture of 4.0 g. of p-hydroxybenzoic acid and 50 ml. dry ether is added 3.66 g. of cyclopropane carboxylic acid chloride in 3 ml. ether. The mixture is allowed to stand overnight, then cooled to 0° and 3.66 g. of cyclopropane carboxylic acid choride and 7.0 ml. of dry pyridine is added. The mixture is stirred overnight at room temperature, 3 ml. of pyridine and 0.7 ml. of water is added, and the mixture is stirred for an additional 22.5 hours at room temperature. Water and ether are added, the mixture acidified with 3N sulfuric acid, the organic layer separated and extracted twice with ether. The combined organic layers are washed with water and brine, dried over calcium sulfate, and the solvent removed by evaporation to yield 4-carboxyphenylcyclopropane carboxylate.

b. To a mixture of 5.22 g. of the product of a) above in 40 ml. dry ether and 40 ml. dry methylene chloride is added 3.0 ml. ($1.6 \times 2.54 \times 10^{-2}$ moles) of thionyl chloride and 0.5 ml. ($0.3 \times 2.54 \times 10^{-2}$ moles) of dimethylformamide. The mixture is stirred overnight at room temperature and then the solvent is removed to yield a pale yellow liquid.

c. The liquid prepared in b) above is dissolved in 50 ml. of dry ether, cooled to 0°, and 2.75 g. of cyclopropanemethyl alcohol and 4.1 ml. ($2 \times 2.54 \times 110^{-2}$ moles) of dry pyridine is added. The reaction mixture is allowed to warm to room temperature and then stirred for 22 hours. Water, ether, and pentane are then added to the reaction mixture, the organic layer separated, washed with 3N sulfuric acid, aqueous 15% potassium carbonate, water and brine, dried over calcium sulfate, and the solvent removed to yield a pale yellow liquid that is purified by distillation to give cyclopropanemethyl 4-cyclopropanecarbonyloxybenzoate, having a boiling point of 118° bath at 0.05 mm.

EXAMPLE 13

To a solution of 5.0 g. of 1,4-di(chlorocarbonyloxy) benzene is 100 ml. of benzene is added 4.32 g. of cyclopropylmethyl alcohol. The reaction mixture is stirred for 24 hours and then 4 g. of pyridine is added. The reaction mixture is then poured into water, diluted with ether, washed with dilute hydrochloric acid, sodium bicarbonate, water and brine, dried over calcium sulfate, evaported to dryness, and recrystallized from boiling methanol to yield 1,4-bis (cycloproplymethylcarbonyldioxy) benzene, having a meling point of 99°–100°.

A. Preparation of 1,4-bis(cyclopropylmethoxy)-benzene

To a stirred solution of 1 mole of 1,4- dihydroxybenzene in tetrahydrofuran, under nitrogen, is added 2.1 moles of sodium hydride. The reaction mixture is boiled for 10 hours and then 8 moles of hexamethylphosphorictriamide, 2.4 moles of cyclopropylmethyl chloride, and 1.2 moles potassium iodide are added. The reaction mixture is stirred for 5 days at room temperature and then boiled for 48 hours. The reaction mixture is then poured into water, the organic phase extracted with a 1:1 mixture of ether and pentane and washed with water and brine. The mixture is dried over calcium sulfate, the solvent removed, and the resultant product distilled to yield 1,4 -bis(cyclopropylmethyoxy)-benzene.

B. Preparation of 1,4-bis(cyclopropylmethyoxymethyl)benzene

To a stirred solution of 1 mole of 1,4-di(hydroxymethyl) benzene in tetrahydrofuran, under argon at 0°, is added 2 moles of n-butyl lithium. The reaction mixture is warmed to room temperature and stirred for 2 hours. Then, 6 moles of hexamethylphosphorictriamide, 2.4 moles cyclopropylmethyl chloride, and 1.2 moles of potassium iodide are added. The reaction mixture is stirred for 3 days at room temperature and then boiled for 24 hours. The reaction mixture is then poured into water, the organic phase extracted with a 1:1 mixture of ether and pentane and washed with water and brine. The mixture is dried over calcium sulfate, the solvent removed, and the resultant product distilled to yield 1,4 -bis(cyclopropylmethoxymethyl) benzene.

Adults (*Tetranychus urticae*) were allowed to oviposit for twenty-four hours and the underside of castor bean leaf discs (1 cm.) on moist cottonwool. After 24 hours, the adults were removed and the leaf discs were then dipped in acetone solution of 1,4-dimethylenephenyl bis (cyclopropanecarboxylate), at 0.1% concentration. After submersion for 1 second, the solvent on the leaf discs is allowed to dry and the leaf discs are then glued to a plastic petri dish to prevent crumpling. Five days later each disc is observed for hatched and unhatched eggs. Of the treated discs, 100% of the eggs failed to hatch. Of the control discs (treated with acetone only), 9% of the eggs failed to hatch.

Adults (*Tetranychus urticae*) were allowed to oviposit on bean leaves in the confinement of 1.5 cm. circles of tanglefoot glue (mite barrier). Adults were removed after 24 hours. All eggs hatched after 6 days after removal of the adults. Then the leaves were sprayed, until run-off, with 1,4-dimethylenephenyl bis (cyclopropanecarboxylate diluted in 0.1% Tween 20 in water. The mortality was evaluated 72 hours after spraying. $ID_{50}$ of 0.0029% was obtained.

We claim as our invention:

1. A compound of the formula

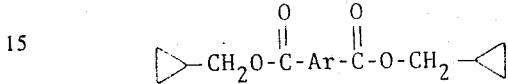

wherein Ar is an aromatic hydrocarbon ring of six to twenty carbon atoms or two phenyl or naphthyl rings joined by a direct bond or by an atom of oxygen, sulfur or nitrogen, said group Ar being optionally substituted by one or two groups selected from methyl, ethyl, halogen, or nitro.

2. The cyclopropylmethyl diester of 4,4'-oxydibenzoic acid, according to claim 1.

3. The compound bis(cyclopropylmethyl) 4,4'-thiodibenzoate according to claim 1.

4. A compound according to claim 1 wherein Ar is 1,4'-phenylene, 2,5-dimethyl-1,4-phenylene, 4,4'-biphenylylene, 2,5-dichloro-1,4-phenylene, or 2-nitro-1,4-phenylene.

5. The compound bis (cyclopropylmethyl) terephthalate, according to claim 4.

6. The compound bis (cyclopropylmethyl) 2,5-dichloroterephthalate, according to claim 4.

7. The compound bis (cyclopropylmethyl) 2,5-dimethylterephthalate, according to claim 4.

8. The compound bis (cyclopropylmethyl) 2-nitroterephthalate, according to claim 4.

9. The compound bis(cyclopropylmethyl) 1,4-benzenediacetic acid diester.